United States Patent
Kataoka et al.

(10) Patent No.: US 11,912,879 B2
(45) Date of Patent: Feb. 27, 2024

(54) FILM FORMING METHOD OF CORROSION RESISTANT FILM, CORROSION RESISTANT MEMBER ON WHICH CORROSION RESISTANT FILM IS FORMED, HEAT EXCHANGER, AND FUEL CELL SYSTEM

(71) Applicant: TOYOTA JIDOSHA KABUSHIKI KAISHA, Toyota (JP)

(72) Inventors: Tomoharu Kataoka, Yaizu (JP); Masao Watanabe, Okazaki (JP); Yuya Kusano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 463 days.

(21) Appl. No.: 17/198,490

(22) Filed: Mar. 11, 2021

(65) Prior Publication Data

US 2021/0309862 A1    Oct. 7, 2021

(30) Foreign Application Priority Data

Apr. 2, 2020 (JP) ................. 2020-066821

(51) Int. Cl.
| | | |
|---|---|---|
| *H01M 8/04* | (2016.01) | |
| *C09D 1/00* | (2006.01) | |
| *H01M 8/04014* | (2016.01) | |
| *H01M 8/04029* | (2016.01) | |
| *F28F 19/06* | (2006.01) | |
| *H01M 8/04111* | (2016.01) | |

(Continued)

(52) U.S. Cl.
CPC ............. *C09D 1/00* (2013.01); *C23F 11/182* (2013.01); *F28F 19/06* (2013.01); *H01M 8/04014* (2013.01); *H01M 8/04029* (2013.01); *H01M 8/04074* (2013.01); *H01M 8/04111* (2013.01)

(58) Field of Classification Search
CPC ........ H01M 8/04014; H01M 8/04029; H01M 8/04074; H01M 8/04111
See application file for complete search history.

(56) References Cited

U.S. PATENT DOCUMENTS

2002/0014325 A1 * 2/2002 Baalmann ............... C23G 5/00
                                                            428/447
2007/0095436 A1   5/2007 Matzdorf et al.

FOREIGN PATENT DOCUMENTS

| JP | H03-104880 A | 5/1991 |
| JP | 2003-313665 A | 11/2003 |
| JP | 2019-108591 A | 7/2019 |

OTHER PUBLICATIONS

Qi et al. (Journal of The Electrochemical Society, 163 (7) C357-C363 (2016)).*

* cited by examiner

*Primary Examiner* — Olatunji A Godo
(74) *Attorney, Agent, or Firm* — Oliff PLC

(57) ABSTRACT

Provided is a film forming method of a corrosion resistant film having a corrosion resistance under acidic atmosphere and a corrosion resistant member on which the corrosion resistant film is coated. The film forming method of the corrosion resistant film includes: bringing a substrate made of aluminum into contact with an aqueous solution containing sulfate ions and fluoride ions; and heating the substrate to boil the aqueous solution on a surface of the substrate and forming a corrosion resistant film containing at least oxygen, fluorine, and sulfur in the aluminum derived from the substrate on the surface of the substrate.

7 Claims, 7 Drawing Sheets

(51) Int. Cl.
*C23F 11/18* (2006.01)
*H01M 8/04007* (2016.01)

FILM FORMING METHOD OF CORROSION RESISTANT FILM, CORROSION RESISTANT MEMBER ON WHICH CORROSION RESISTANT FILM IS FORMED, HEAT EXCHANGER, AND FUEL CELL SYSTEM

CROSS REFERENCE TO RELATED APPLICATIONS

The present application claims priority from Japanese patent application JP 2020-066821 filed on Apr. 2, 2020, the entire content of which is hereby incorporated by reference into this application.

BACKGROUND

Technical Field

The present disclosure relates to a film forming method of a corrosion resistant film, a corrosion resistant member on which the corrosion resistant film is formed, a heat exchanger including the corrosion resistant member, and a fuel cell system including the heat exchanger.

Background Art

As this kind of technique, for example, JP 2003-313665 A discloses a film forming method that causes an aluminum oxide material to be opposed to a surface of a metallic substrate, heats the aluminum oxide material under fluorine gas atmosphere, and forms a corrosion resistant film made of aluminum fluoride on the surface of the substrate.

SUMMARY

However, while the corrosion resistant film described in JP 2003-313665 A is chemically stabilized and has a high corrosion resistance under the absence of water content, such as in a vacuum chamber, the corrosion resistant film reacts to acid water content under acidic atmosphere containing the acid water content, and the corrosion resistant film is possibly dissolved.

The present disclosure has been made in view of the above-described problem, and the present disclosure provides a film forming method of a corrosion resistant film having a corrosion resistance under acidic atmosphere and a corrosion resistant member on which the corrosion resistant film is coated.

In view of the problem, a film forming method of a corrosion resistant film according to the present disclosure comprises: bringing a substrate made of aluminum into contact with an aqueous solution containing sulfate ions and fluoride ions; and heating the substrate to boil the aqueous solution on a surface of the substrate to form a corrosion resistant film containing oxygen, fluorine, and sulfur in the aluminum derived from the substrate on the surface of the substrate.

With the present disclosure, the substrate is heated in a state where the substrate made of the aluminum is brought into contact with the aqueous solution containing the sulfate ions and the fluoride ions to boil the aqueous solution on the surface of the substrate.

Generation of air bubbles of vapor and desorption of the air bubbles of the vapor repeatedly occur on the surface of the substrate. Here, on a contact surface of the air bubble in the surface (a heat transfer surface of the aqueous solution) of the substrate, the sulfate ions and the fluoride ions in the aqueous solution are concentrated. The aqueous solution containing the sulfate ions and the fluoride ions is an acid aqueous solution, and pH is assumed to be low at and near the contact surface of the air bubble caused by the concentration. Accordingly, on the contact surface of the air bubble, a metal compound containing oxygen, fluorine, and sulfur in the aluminum is generated, and the sulfate ions and the fluoride ions in the aqueous solution are consumed.

When the generated air bubble is desorbed from the surface of the substrate, a new (the sulfate ions or the fluoride ions are not consumed) aqueous solution flows to the surface of the substrate, and the air bubbles are additionally generated at and near the surface where the metal compound made of the aluminum, the oxygen, the fluorine, and the sulfur has been generated. Thus, repetition of (1) the generation of the metal compound by the generation of the air bubble and (2) the flow of the fresh aqueous solution to the surface of the substrate by the desorption of the air bubbles, a variation of pH and a variation of the ions in association with the growth and desorption of the air bubbles sequentially occur. Accordingly, behaviors of dissolution of an oxide film on the surface of the substrate, and taking of the sulfate ions and the fluoride ions into the surface of the substrate repeatedly occur. As a result, the corrosion resistant film containing at least the oxygen, the fluorine, and the sulfur in the aluminum derived from the substrate is formed on the surface of the substrate. As a result, the corrosion resistant film that is less likely to react to acid water content under acidic atmosphere containing the acid water content and having a high corrosion resistance can be obtained.

In some embodiments, the substrate forms a wall portion of a storage portion that stores the aqueous solution as a part of a heat exchanger. In the bringing, the storage portion is caused to store the aqueous solution. In the heating, a heat of a thermal fluid introduced to the heat exchanger and having a temperature higher than a boiling point of the aqueous solution is transmitted to the aqueous solution via the wall portion to boil the aqueous solution.

According to this aspect, the wall portion of the storage portion of the heat exchanger is formed of the substrate made of the aluminum. When the storage portion is caused to store the aqueous solution in the bringing, the surface of the wall portion (the surface of the substrate) contacts the aqueous solution. In the heating, since the thermal fluid introduced to the heat exchanger has the temperature higher than the boiling point of the aqueous solution, the heat of the thermal fluid is transmitted to the aqueous solution via the wall member and the aqueous solution boils. This boiling of the aqueous solution allows forming the corrosion resistant film on the surface of the wall portion of the storage portion.

In some embodiments, the heat exchanger is disposed in a fuel cell system including a fuel cell stack that performs electric generation with an air and a hydrogen gas. The aqueous solution is produced water produced during the electric generation by the fuel cell stack. The thermal fluid is an air discharged from an air compressor. In the bringing, the produced water produced in the fuel cell stack is supplied to the storage portion. In the heating, the air discharged from the air compressor is supplied to the heat exchanger.

According to this aspect, in the bringing, the produced water produced in the fuel cell stack is supplied to the storage portion, and in the heating, the air discharged from the air compressor is supplied to the heat exchanger. Therefore, while the electric generation is performed in the fuel cell stack, the corrosion resistant film can be formed on the wall portion of the storage portion of the heat exchanger. Especially, the produced water produced in the fuel cell stack is likely to be acidity, and the sulfate ions and the fluoride ions are likely to be eluted from an electrolyte membrane included in the fuel cell stack into the produced water during electric generation. Accordingly, the use of the produced water allows forming the corrosion resistant film, and the formed corrosion resistant film has a high corrosion resistance to the produced water.

In some embodiments, in the bringing, the sulfate ions have a concentration of 0.18 ppm or more, the fluoride ions have a concentration of 0.03 ppm or more in the aqueous solution, and pH of the aqueous solution at a temperature of 20° C. is from 3 to 6. According to this aspect, the sulfate ions and the fluoride ions contained in the aqueous solution satisfying the range and the pH in the aqueous solution satisfying the range allow forming the film having a high corrosion resistance.

A corrosion resistant member according to the present disclosure comprises a substrate made of aluminum having a surface on which a corrosion resistant film is coated. The corrosion resistant film is a film containing oxygen, fluorine, and sulfur in aluminum. When a content of the aluminum by at % is defined as Al, a content of the fluorine by at % is defined as F, and a content of the sulfur by at % is defined as S, F/Al is in a range of from 0.020 to 0.040 and S/Al is in a range of from 0.005 to 0.010 in the corrosion resistant film.

According to the present disclosure, by designing the contents of the fluorine and the sulfur contained in the corrosion resistant film to the aluminum in the above-described ranges, the corrosion resistant film becomes a film excellent in acid resistance. Here, when F/Al is less than 0.020 or S/Al is less than 0.005, the corrosion resistant film is less likely to be the corrosion resistant film excellent in acid resistance. Meanwhile, when F/Al exceeds 0.040 or S/Al exceeds 0.010, the effect of the acid resistance cannot be expected more than that, and since the proportion of Al decreases, thermal conductivity is possibly deteriorated.

The heat exchanger according to the present disclosure comprises the corrosion resistant member. The corrosion resistant film is formed on a surface in contact with liquid in the surface of a wall portion of a storage portion that stores the liquid. The heat exchanger transmits a heat of a thermal fluid having a temperature higher than a boiling point of the liquid to the liquid via the wall portion to cool the thermal fluid by a latent heat of vaporization of the liquid.

According to the present disclosure, the liquid in the storage portion of the heat exchanger serves as the cooling water, boils by the heat of the thermal fluid transmitted via the wall portion, and absorbs the heat of the thermal fluid by the latent heat of vaporization by the boiling, and thus the thermal fluid can be cooled. Here, due to contamination of the inside of the heat exchanger or the like, even when the liquid becomes acidity, since the corrosion resistant film is formed on the surface of the wall portion (corrosion resistant member) in contact with the liquid in the surface of the wall portion, a corrosion of the wall portion of the storage portion can be reduced.

A fuel cell system according to the present disclosure comprises the above-described heat exchanger, a fuel cell stack, and an air compressor. The fuel cell stack performs electric generation with an air and a hydrogen gas. The air compressor discharges the air as the thermal fluid. The air compressor supplies the air to the fuel cell stack via the heat exchanger. The fuel cell system includes a produced water supply portion. The produced water supply portion supplies produced water produced during the electric generation by the fuel cell stack to the heat exchanger as the liquid.

According to the present disclosure, although the produced water produced in the fuel cell stack is likely to be acidity, since the corrosion resistant film is formed on the surface of the wall portion of the storage portion that stores the produced water, the corrosion of this wall portion can be reduced.

The corrosion resistant film formed by the film forming method according to the present disclosure and the corrosion resistant film formed on the corrosion resistant member have the corrosion resistance under acidic atmosphere.

DETAILED DESCRIPTION

With reference to FIG. 1 to FIG. 6, a film forming method of a corrosion resistant film and according to embodiments a corrosion resistant member including the corrosion resistant film will be described.

First Embodiment

Figure 1:
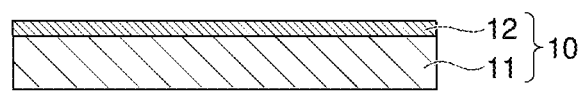
FIG. 1 is a schematic cross-sectional view of a corrosion resistant film according to a first embodiment of the present disclosure.

As illustrated in FIG. 1, a corrosion resistant member 10 includes a substrate 11 made of aluminum and a corrosion resistant film 12 coated on a surface of the substrate 11. Examples of the substrate 11 include pure aluminum, an Al—Cu-based alloy, an Al—Mn-based alloy, an Al—Si-based alloy, an Al—Mg-based alloy, and an Al—Mg—Si-based alloy. In this embodiment, since the corrosion resistant film 12 ensures a corrosion resistance of the corrosion resistant member 10, the aluminum constituting the substrate 11 is pure aluminum in some embodiments from an aspect of thermal conductivity.

The corrosion resistant film 12 is a film containing oxygen, fluorine, and sulfur in the aluminum. As apparent from a manufacturing method described later, the aluminum contained in the corrosion resistant film 12 is derived from the aluminum of the substrate 11, and the oxygen, the fluorine, and the sulfur contained in the corrosion resistant film 12 are derived from an aqueous solution L for film formation described later. The corrosion resistant film 12 is a compound (aluminum alloy) that contains the aluminum as the main material and contains the oxygen, the fluorine, and the sulfur.

When a content of the aluminum by at % is defined as Al, a content of the fluorine by at % is defined as F, and a content of the sulfur by at % is defined as S, F/Al is in the range of from 0.020 to 0.040 and S/Al is in the range of from 0.005 to 0.010 in the corrosion resistant film 12 to the entire corrosion resistant film 12. By designing the contents of the fluorine and the sulfur contained in the corrosion resistant film 12 to the aluminum in the above-described ranges, the corrosion resistant film 12 becomes a film excellent in acid resistance. Consequently, the corrosion resistant member 10 becomes a member having thermal conductivity and a corrosion resistance, and therefore the corrosion resistant member 10 is a member optimum to be used as a component (member) of a heat exchanger or the like, which boils a liquid, such as water, and performs heat exchange.

As apparent from test results described later, by designing the contents of the fluorine and the sulfur contained in the corrosion resistant film 12 to the aluminum in the above-described ranges, the corrosion resistant film 12 becomes the film excellent in acid resistance. Here, F/Al of less than 0.020 or S/Al of less than 0.005 results in insufficient content of the fluorine or the sulfur to the aluminum, and therefore the corrosion resistant film 12 is less likely to be the corrosion resistant film excellent in acid resistance. Meanwhile, when F/Al exceeds 0.040 or S/Al exceeds 0.010, the effect of the acid resistance cannot be expected more than that, and since the proportion of Al decreases, thermal conductivity is possibly deteriorated. The following describes the film forming method of the corrosion resistant film 12.

1. Film Forming Method

The film forming method of the corrosion resistant film according to this embodiment is a method that forms the corrosion resistant film on the surface of the substrate 11 made of the aluminum. This film forming method includes a contact step and a film forming step.

1-1. Contact Step

Figure 2:
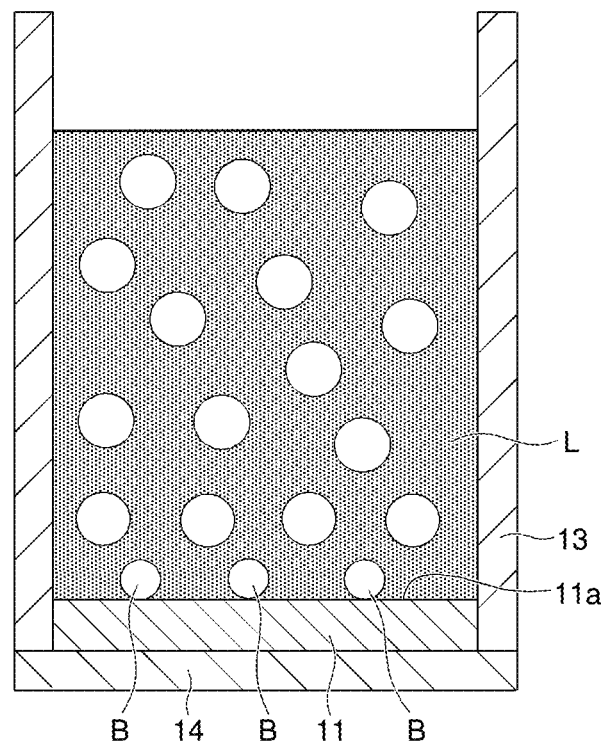
FIG. 2 is a schematic conceptual diagram of a film forming device to form the corrosion resistant film according to the first embodiment of the present disclosure.

The contact step brings the substrate 11 made of the aluminum into contact with the aqueous solution L containing sulfate ions and fluoride ions. In this embodiment, as illustrated in FIG. 2, a container 13 houses the substrate 11 and the aqueous solution L. In this embodiment, a bottom portion of the container 13 is constituted of an electric heater 14, and after the substrate 11 is placed on the electric heater 14, the aqueous solution L is housed in the container 13. This allows the aqueous solution L to be brought into contact with the surface of the substrate 11.

As described above, examples of the aluminum constituting the substrate 11 include pure aluminum, an Al—Cu-based alloy, an Al—Mn-based alloy, an Al—Si-based alloy, an Al—Mg-based alloy, and an Al—Mg—Si alloy, and the aluminum is pure aluminum in some embodiments.

The aqueous solution L containing the sulfate ions and the fluoride ions can be obtained by dissolving salt ionized to these ions in water, and, for example, can be obtained by dissolving sodium sulfate and sodium fluoride in water. Besides, as described later, during electric generation by a fuel cell stack, produced water produced as by-product consequently becomes the aqueous solution L containing the sulfate ions and the fluoride ions in some cases.

The sulfate ions have a concentration of 0.18 ppm or more, and the fluoride ions have a concentration of 0.03 ppm or more in the aqueous solution L, and pH under ordinary temperature (20° C.) is from 3 to 6 in some embodiments.

The sulfate ions and the fluoride ions contained in the aqueous solution L satisfying the range and the pH in the aqueous solution L satisfying the range allow forming the film having a high corrosion resistance.

Here, the sulfate ions contained in the aqueous solution may have a concentration of 100 ppm or less in some embodiments, and the sulfate ions may also have a concentration of 20 ppm or less in some embodiments. Furthermore, the fluoride ions contained in the aqueous solution L may have a concentration of 50 ppm or less in some embodiments, and the fluoride ions may also have a concentration of 5 ppm or less in some embodiments. Furthermore, a ratio of a concentration of the fluoride ions to that of the sulfate ions is in the range of from three to six times in some embodiments.

Furthermore, the pH of the aqueous solution L of less than 3 possibly elutes the aluminum constituting the substrate 11 and the pH of the aqueous solution L in excess of 6 possibly results in insufficient corrosion resistance of the corrosion resistant film 12 formed on the substrate 11.

1-2. Film Forming Step

As illustrated in FIG. 1, the film forming step heats the substrate 11 to boil the aqueous solution L with a surface of 11a of the substrate 11 and forms the corrosion resistant film 12 containing at least the oxygen, the fluorine, and the sulfur in the aluminum derived from the substrate 11 on the surface of the substrate 11.

Figure 3:
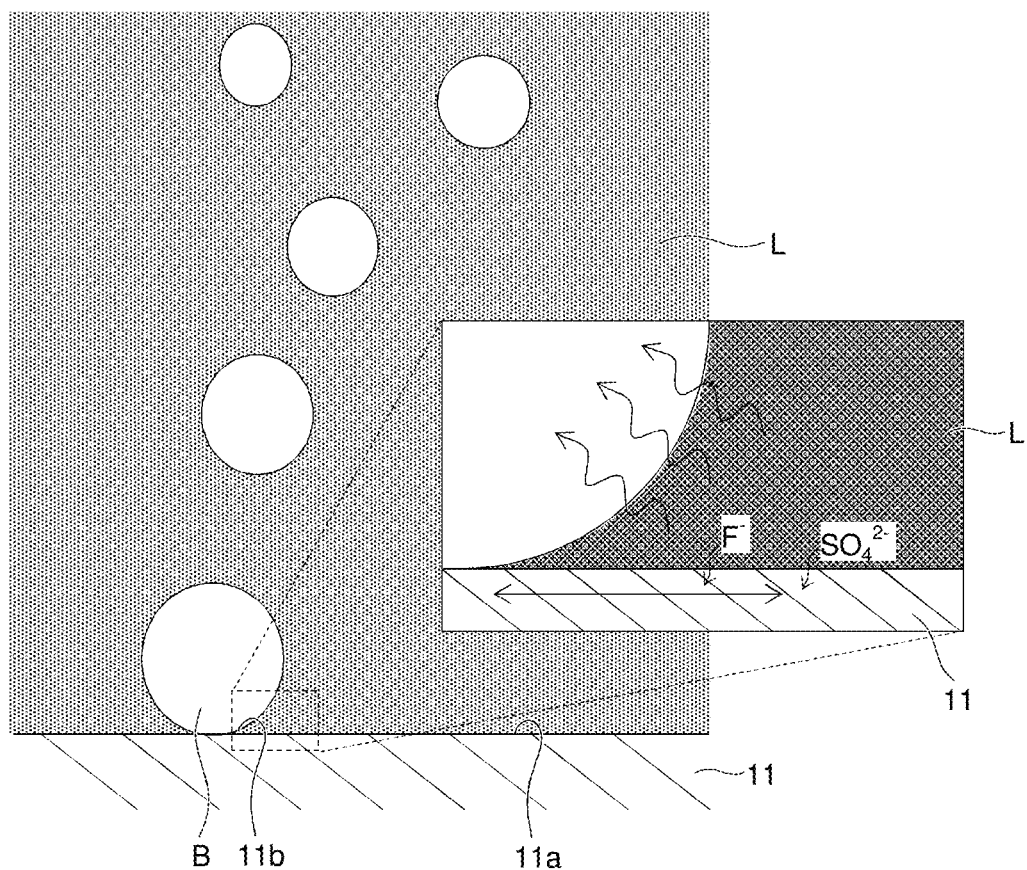
FIG. 3 is a schematic conceptual diagram to describe a principle of a film forming method according to the first embodiment.

Specifically, as illustrated in FIG. 2, in the state where the substrate 11 is brought into contact with the aqueous solution L, the substrate 11 is heated via the electric heater 14 such that the surface of the substrate in contact with the aqueous solution L in the substrate 11 becomes equal to or more than a boiling point of the aqueous solution L. More specifically, as illustrated in FIG. 3, the aqueous solution L is boiled on the surface of the substrate 11 in a nucleate boiling region in some embodiments.

Figure 4:
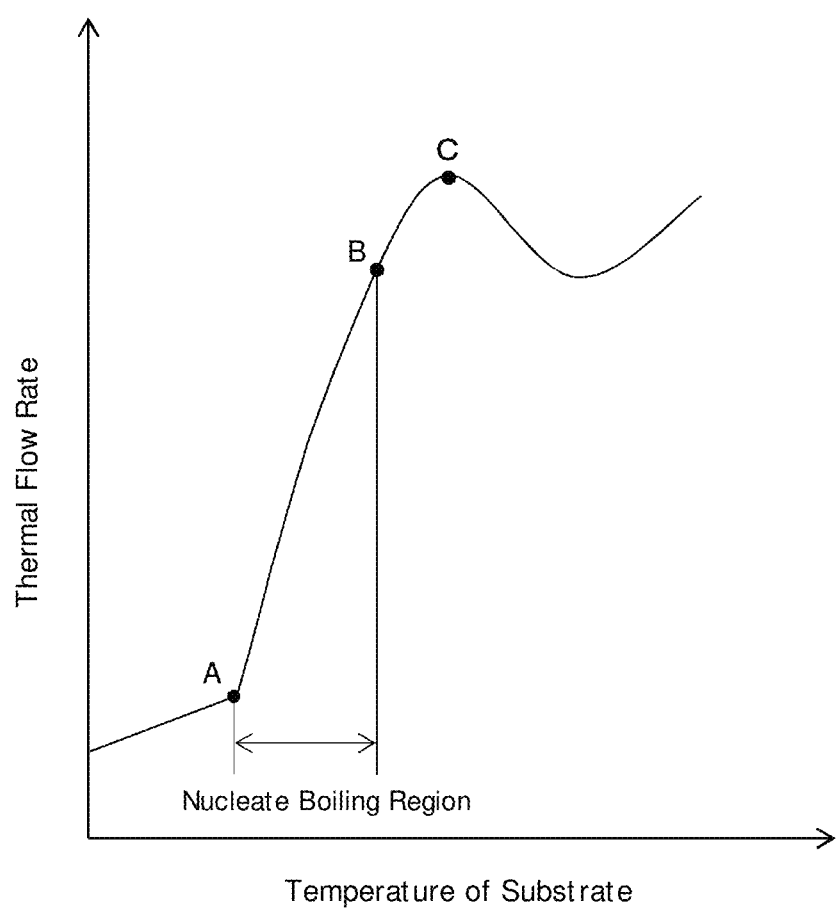
FIG. 4 is a schematic diagram of a boiling curve of an aqueous solution illustrated in FIG. 1.

Specifically, the nucleate boiling region is a region of a section from a saturation start point A to a nucleate boiling point B illustrated in FIG. 4. In this region, when a temperature of the aqueous solution L increases and partially reaches to the boiling point, boiling starts and a heat flux rapidly increases. The boiling becomes nucleate boiling, which generates vapor bubbles from specific points (foam nuclei). Accordingly, air bubbles B occur on the overheated surface 11a of the substrate 11 on which the film is formed. Note that at a local maximum heat flux point (dryout) C or greater, the aqueous solution L enters a transition boiling region and a film boiling region. Since a film of an air bubble is likely to be formed on the surface of the substrate 11 in the regions, it is not preferred.

By thus heating the substrate 11, the generation of the air bubbles B of vapor and desorption of the air bubbles B of the vapor repeatedly occur on the surface 11a of the substrate 11. Here, on the contact surface of the air bubble B in the surface (a heat transfer surface of the aqueous solution) 10a of the substrate 11, the sulfate ions and the fluoride ions in the aqueous solution L are concentrated. The aqueous solution L containing the sulfate ions and the fluoride ions is an acid aqueous solution, and pH is assumed to be low at and near the contact surface of the air bubble B caused by the concentration. Accordingly, on a vaporization surface 11b as the contact surface of the air bubble B, a metal compound containing oxygen, fluorine, and sulfur in the aluminum is generated, and the sulfate ions and the fluoride ions in the aqueous solution L are consumed.

When the generated air bubble B is desorbed from the vaporization surface 11b of the substrate 11, a new (the sulfate ions or the fluoride ions are not consumed) aqueous solution L flows to the surface 11a of the substrate 11, and the air bubbles B are additionally generated at and near the surface where the metal compound has been generated. The repetition of the generation of the metal compound by the generation of the air bubble B and the flow of the fresh aqueous solution L to the surface of the substrate by the desorption of the air bubbles B, a variation of pH and a variation of the ions in association with the growth and desorption of the air bubbles B sequentially occur.

Accordingly, behaviors of dissolution of an oxide film on the surface 11a of the substrate 11, and taking of the sulfate ions and the fluoride ions into the surface 11a of the substrate 11 repeatedly occur. As a result, the corrosion resistant film containing at least the oxygen, the fluorine, and the sulfur in the aluminum derived from the substrate is formed on the surface 11a of the substrate 11. As a result, the corrosion resistant film 12 that is less likely to react to acid water content under acidic atmosphere containing the acid water content and having a high corrosion resistance can be obtained.

Second Embodiment

Figure 5:
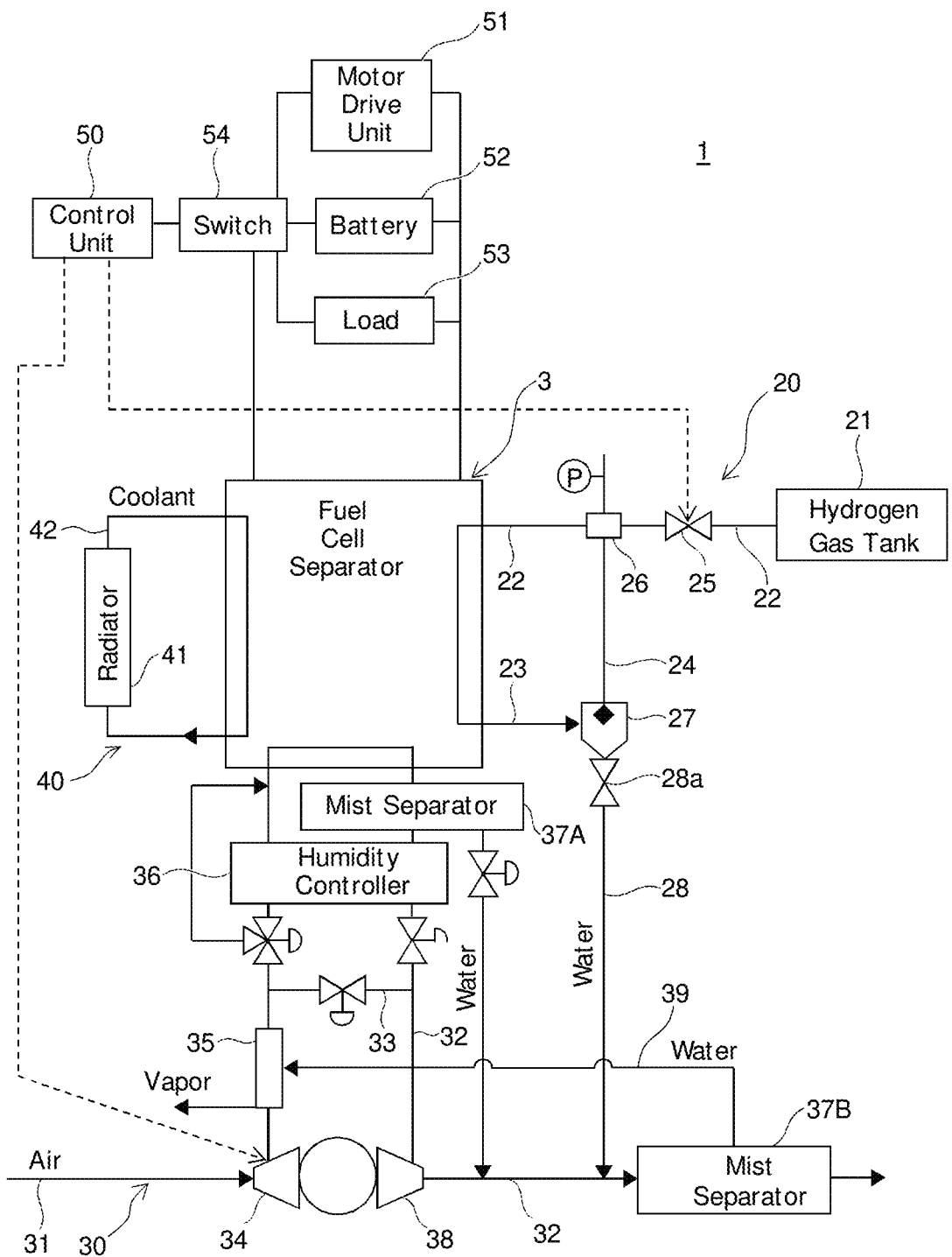
FIG. 5 is a schematic diagram schematically illustrating a system configuration of a fuel cell system according to one embodiment that includes a heat exchanger (intercooler) that forms the corrosion resistant film according to a second embodiment of the present disclosure.
Figure 6:
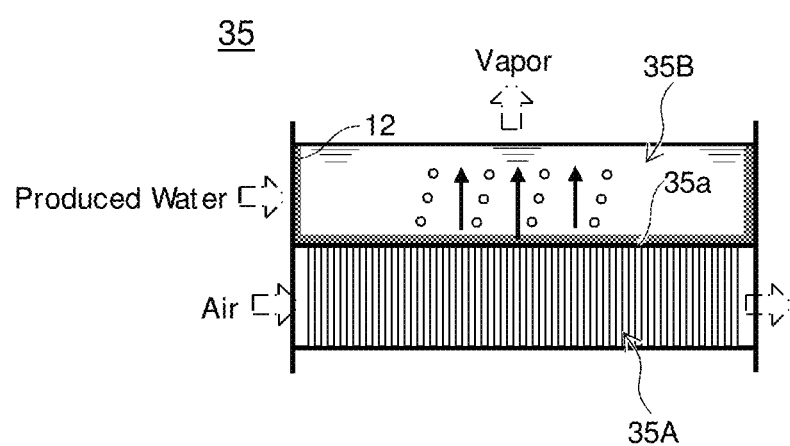
FIG. 6 is a schematic diagram illustrating a schematic configuration of the intercooler of the fuel cell system in FIG. 5.

With reference to FIGS. 5 and 6, a heat exchanger (intercooler) that includes the corrosion resistant member according to this embodiment of the present disclosure and a fuel cell system 1 that includes the heat exchanger will be described. In FIG. 5, the fuel cell system 1 is, for example, mounted to a fuel cell vehicle and used as a driving power supply. The fuel cell system 1 of this embodiment at least includes a fuel cell stack 3, a fuel gas system 20, an oxidant gas system 30, a coolant system 40, and a control unit 50 and is a solid polymer fuel cell. Note that the fuel cell stack 3 is not limited to the solid polymer fuel cell, and a fuel cell of another type, such as a solid oxide fuel cell, may be used.

The fuel cell stack 3 has a stack structure in which a plurality of unit cells are stacked, and performs electric generation by supply of a fuel gas containing hydrogen and an oxidant gas containing oxygen. In this embodiment, air and a hydrogen gas are supplied to the fuel cell stack 3 for electric generation. When the fuel cell stack 3 performs the electric generation with the air and the hydrogen gas, produced water is generated and discharged. This produced water contains the sulfate ions and the fluoride ions. The sulfate ions ($SO_4^{2-}$) and the fluoride ions (for example, $F(OH_2)^{4-}$) are derived from an electrolyte membrane of a fuel cell. Specifically, when an electrolyte membrane that contains fluorine ions, such as Nafion (registered trademark) and a sulfonic acid group is used as the electrolyte membrane, during the electric generation by the fuel cell stack 3, the above-described sulfate ions and fluoride ions are eluted to the produced water from the electrolyte membrane, and these ions are contained in the produced water.

In each unit cell constituting the fuel cell stack 3, a channel (anode side channel) through which the hydrogen gas flows as the fuel gas is formed on an anode side and a channel (cathode side channel) through which the air flows as the oxidant gas is formed on a cathode side with the electrolyte membrane interposed therebetween. A coolant channel through which a coolant to cool the inside of the stack flows is formed inside the fuel cell stack 3.

The fuel gas system 20 is a channel to supply a hydrogen gas to the fuel cell stack 3, and includes at least a hydrogen gas tank 21, a hydrogen gas supply channel 22, a hydrogen gas discharge channel 23, a hydrogen gas circulation channel 24, a variable pressure regulating valve 25, an injector 26, and a gas-liquid separator 27. The hydrogen gas supply channel 22 includes a fuel gas pump and the like (not illustrated). The hydrogen gas tank 21 is a storage tank that stores the hydrogen gas as the fuel gas.

The hydrogen gas stored in the hydrogen gas tank 21 is decompressed by the variable pressure regulating valve 25, and supplied to the hydrogen gas supply channel 22, which is connected to a fuel gas channel in the cells of the fuel cell stack 3, via the injector 26.

The hydrogen gas discharge channel 23 is a channel through which a hydrogen off-gas discharged from the fuel cell stack 3 flows. The hydrogen gas circulation channel 24 is connected to the hydrogen gas discharge channel 23 and a portion of the hydrogen gas supply channel 22 on the downstream side with respect to the injector 26. The hydrogen gas circulation channel 24 recirculates a hydrogen off-gas in which water content is separated by the gas-liquid separator 27 to the hydrogen gas supply channel 22.

Therefore, in the fuel cell system 1, while the hydrogen is consumed by the power generation, the hydrogen gas is circulated through the hydrogen gas discharge channel 23, the hydrogen gas circulation channel 24, a part of the hydrogen gas supply channel 22, and a channel for the hydrogen gas disposed inside the fuel cell stack 3 by a hydrogen gas pump (not illustrated).

The gas-liquid separator 27 disposed in a connecting portion between the hydrogen gas discharge channel 23 and the hydrogen gas circulation channel 24 has a function of separating water content from a gas (hydrogen, nitrogen, and the like) in the hydrogen off-gas. The hydrogen not consumed by the power generation in the hydrogen off-gas is separated by the gas-liquid separator 27 and circulated to the hydrogen gas supply channel 22 by the hydrogen gas pump. The water content and impurities separated by the gas-liquid separator 27 are discharged outside from a hydrogen gas release channel 28, which includes a purge valve 28a connected to the gas-liquid separator 27, passing through an oxidation gas discharge channel 32.

The oxidant gas system 30 is a channel to supply an air containing oxygen to the fuel cell stack 3, and includes an oxidation gas supply channel 31, the oxidation gas discharge channel 32, and a bypass channel 33. On the oxidation gas supply channel 31, at least an air compressor 34, an intercooler 35, and a humidity controller 36 are disposed. The air compressor 34 causes the fuel cell stack to discharge the air and supplies the discharged air to the fuel cell stack 3 via the intercooler 35. The intercooler 35 has a function of cooling the air that has become high temperature (a temperature exceeding 100° C.) due to the compression by the air compressor 34. The intercooler 35 will be described later in detail.

The oxidation gas discharge channel 32 is a channel to discharge an oxygen off-gas consumed in the fuel cell stack 3. The oxidation gas discharge channel 32 includes a mist separator 37A that collects water content in the oxygen off-gas from the upstream side, and the humidity controller 36 disposed to the oxidation gas supply channel 31 is connected to the downstream side of the mist separator 37A. The humidity controller 36 controls humidity of the air in the entering side of the fuel cell stack 3 and the air in the exiting side of the fuel cell stack 3. The water content collected by the mist separator 37A is discharged to the downstream side of the oxidation gas discharge channel 32 via a water stop valve or the like.

On the downstream side of the humidity controller 36, an expander 38 and a mist separator 37B are disposed. The expander 38 internally includes a turbine that rotates when the oxygen off-gas passes through, and has a function of assisting the air compression by supplying this rotational force to the air compressor 34. The water content of an oxygen off-gas that has passed through the expander 38, the water content collected by the mist separator 37A, and the water content separated by the gas-liquid separator 27 flow in the mist separator 37B passing through the oxidation gas discharge channel 32, and the mist separator 37B stores them as the produced water.

The produced water stored in the mist separator 37B is supplied to the intercooler 35 passing through a pipe 39 connected from the mist separator 37B to the intercooler 35. Accordingly, the intercooler 35 is equivalent to the "heat exchanger" in the present disclosure, and the mist separator 37B and the pipe 39 are equivalent to a produced water supply portion of the fuel cell system in the present disclosure.

The air passing through the intercooler 35 is humidified by the humidity controller 36 disposed in its downstream side, and supplied to the fuel cell stack 3. The humidity controller 36 is disposed to extend over the oxidation gas supply channel 31 and the oxidation gas discharge channel 32, and a part of the produced water of the fuel cell stack 3 stored in the mist separator 37A disposed to the oxidation gas discharge channel 32 flows in the humidity controller 36.

The intercooler 35 is a device that transmits heat of the air (heat of the air at 100° C. or more (for example, 200° C.)) having a temperature higher than the boiling point of the produced water to the produced water in the storage portion 35B via a wall portion 35a of a storage portion 35B described later, and cools the air by latent heat of vaporization of the produced water. Accordingly, the produced water is the "liquid" in the present disclosure and the air is the "thermal fluid" in the present disclosure.

As illustrated in a schematic diagram of FIG. 6 illustrating the schematic configuration, the intercooler 35 includes a channel 35A through which the heated high-temperature air passes and the storage portion 35B in which the produced water (liquid) lower than the air in temperature is stored. The channel 35A and the storage portion 35B are partitioned via the wall portion 35a of the intercooler 35. The channel 35A includes multiple fins formed of a metal plate material, and the air compressed by the air compressor 34 to become high temperature passes between the fins. In this embodiment, the heat exchange via the wall portion 35a of the intercooler 35 cools the high temperature air while the produced water is vaporized into vapor. The produced water flows into the storage portion 35B and is stored, and when the produced water becomes a predetermined storage amount or more, the produced water is discharged from the storage portion 35B.

In this embodiment, the material (main material) of the intercooler 35 is aluminum. Accordingly, the channel 35A and the storage portion 35B employ aluminum as the material. In the storage portion 35B positioned on the upper portion of the intercooler 35, the wall portion 35a in contact with the produced water is equivalent to the substrate according to the first embodiment. The corrosion resistant film 12 is formed on the surface in contact with the produced water in the surface of the wall portion 35a of the storage portion 35B that stores the produced water as the liquid.

In this embodiment, the produced water in the storage portion 35B of the intercooler 35 becomes cooling water and is boiled by the heat of the air transmitted via the wall portion 35a. The latent heat of vaporization by boiling absorbs the heat of the air discharged from the air compressor 34, and this air can be cooled. Here, even when the produced water becomes acidity during electric generation due to the above-described composition of the electrolyte membrane or the like, since the corrosion resistant film 12 is formed on the surface of the wall portion 35a in contact with the produced water in the surface of wall portion 35a, a corrosion of the wall portion 35a of the storage portion 35B can be reduced.

The coolant system 40 includes a radiator 41, a coolant channel 42 that circulates the coolant in the coolant channels inside the radiator 41 and the fuel cell stack 3, and a coolant pump (not illustrated). The coolant system 40 has a function to cool inside the fuel cell stack 3 by circulating the coolant through the coolant channel 42 to emit the heat by the radiator 41.

The fuel cell system 1 includes the control unit 50 that controls the electric power generated by the fuel cell stack 3. The control unit 50 includes a microcomputer, and includes a CPU, a ROM, a RAM, and an input/output port. The control unit 50 is connected to a switch 54 that controls a motor drive unit 51, a battery 52, and a load 53. The switch 54 is connected to the fuel cell stack 3 via an ammeter 55. The ammeter 55 measures a current value output from the fuel cell stack 3.

The control unit 50 receives a detected value of the ammeter 55, controls the air compressor 34 disposed in the oxidant gas system 30, and controls the variable pressure regulating valve 25 disposed in the fuel gas system 20, thus controlling the amount of power generation of the fuel cell stack 3.

The motor drive unit 51 has a function to drive a motor of a fuel cell vehicle (not illustrated) using the electric power generated by the fuel cell stack 3. In this fuel cell system 1, the battery 52 and the load 53 are connected in parallel to the motor drive unit 51. The battery 52 stores a surplus power when the electric power consumed by the motor drive unit 51 is smaller than the electric power output from the fuel cell stack 3. When the electric power is sufficiently stored, the battery 52 supplies the electric power to the motor drive unit 51. In a state where the battery 52 is fully charged, the load 53 consumes the surplus power when there is still the surplus power. The switch 54 switches the supply of the electric power between the fuel cell stack 3, the motor drive unit 51, the battery 52, and the load 53.

2. Film Forming Method of Corrosion Resistant Film 12

The film forming method of the corrosion resistant film 12 in the wall portion 35a of the intercooler 35 in the fuel cell system 1 of this embodiment configured as described above will be described. In this embodiment, during electric generation by the fuel cell system 1, the control unit 50 controls the variable pressure regulating valve 25 of the fuel gas system 20 that supplies the hydrogen gas and supplies the hydrogen gas to the fuel cell stack 3 through the hydrogen gas supply channel 22.

The control unit 50 controls the air compressor 34 of the oxidant gas system 30 that supplies the air, and supplies the air to the fuel cell stack 3 passing through the oxidation gas supply channel 31. Accordingly, the fuel cell stack 3 becomes the operating state in which the hydrogen gas flows through the channel in the anode side and the air flows through the channel in the cathode side while having the electrolyte membrane interposed therebetween, and the electric power is generated by the chemical reaction inside the stack. Thus, the produced water is generated.

The hydrogen off-gas after the reaction enters the gas-liquid separator 27 passing through the hydrogen gas discharge channel 23 to be separated into water content and gas, and the water content enters the mist separator 37B passing through the hydrogen gas release channel 28 to be stored.

The gas separated by the gas-liquid separator 27 merges into the hydrogen gas supply channel 22 passing through the hydrogen gas circulation channel 24, is supplied to the fuel cell stack 3 again by the injector 26, and circulates.

The air off-gas after the reaction enters the oxidation gas discharge channel 32, and the water content is collected by the mist separator 37A. The water content collected in the mist separator 37A and the water content separated in the gas-liquid separator 27 are stored in the mist separator 37B through the oxidizing gas discharge channel 32 as produced water, and are supplied to the intercooler 35 through the pipe 39. The produced water supplied to the intercooler 35 is stored in the storage portion 35B. Thus, the produced water can be brought into contact with the wall portion 35a as the substrate.

In the intercooler 35, the air compressed by the air compressor 34 to become high temperature is cooled by the supplied produced water. That is, as illustrated in FIG. 2, for example, the air of the high temperature of approximately 200° C. passes through the channel 35A, and the heat of the air is transmitted to the wall portion 35a. This transmitted heat boils the produced water in the storage portion 35B and air bubbles are generated. The high-temperature air is cooled by the produced water by the latent heat of vaporization.

Meanwhile, a condition for boiling the produced water is similar to the case described in the first embodiment, and the generation, the growth, and the desorption of the air bubbles of vapor of the produced water are repeated on the surface of the wall portion 35a. Consequently, by the phenomenon same as the phenomenon described in the first embodiment, the aluminum reacts to the sulfate ions and the fluoride ions on the surface of the wall portion 35a (of the storage portion 35B) of the intercooler 35, and thus the corrosion resistant film 12 is formed. Note that regulating a discharge pressure of the air discharged from the air compressor 34 allows regulating the temperature of the air. Thus, the heat amount transmitted to the produced water is regulated, and as a result, the temperature of the surface of the wall portion 35a is regulated, and thus the condition for boiling the produced water as one film forming condition can be set.

In this embodiment, as described above, the produced water produced during the electric generation with the air and the hydrogen gas in the fuel cell stack 3 contains the sulfate ions and the fluoride ions. With the use of the electrolyte membrane containing the fluorine ions and the sulfonic acid group, the sulfate ions and the fluoride ions are eluted into the produced water from the electrolyte membrane during the electric generation of the fuel cell stack 3, and these ions are contained in the produced water. Generally, similarly to the first embodiment, in the electrolyte membrane used for the fuel cell stack 3, the sulfate ions have a concentration of 0.18 ppm or more and the fluoride ions have a concentration of 0.03 ppm or more in the produced water, and pH of the aqueous solution at a temperature of 20° C. meets 3 to 6.

Thus, the produced water produced in the fuel cell stack 3 is supplied to the storage portion 35B, and the air discharged from the air compressor 34 is introduced to the intercooler 35. Thus, while the fuel cell stack 3 performs electric generation, the produced water is boiled in the storage portion 35B, and the corrosion resistant film 12 can be formed on the wall portion 35a of the storage portion 35B of the intercooler 35.

Especially, the produced water produced in the fuel cell stack 3 is likely to be acidity, and the sulfate ions and the fluoride ions are likely to be eluted from the electrolyte membrane included in the fuel cell stack 3 into the produced water during electric generation. Accordingly, the use of the produced water allows forming the corrosion resistant film 12, and the formed corrosion resistant film 12 has a high corrosion resistance to the produced water.

EXAMPLES

The examples according to the present disclosure will be described below.

Example 1

Figure 7:
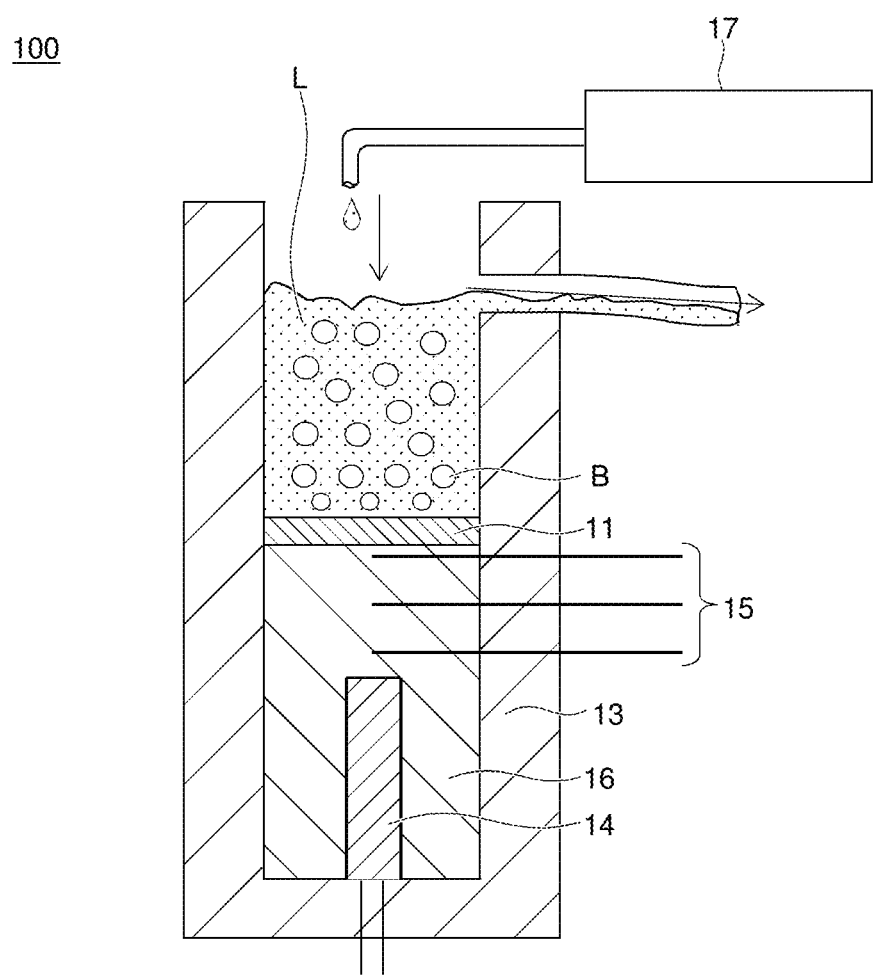
FIG. 7 is a schematic diagram of a film forming device according to Example 1.

Using the film forming device 100 illustrated in FIG. 7, a corrosion resistant film was formed on the surface of the substrate 11 made of aluminum (pure aluminum: JIS Standard A1000). Specifically, the substrate 11 was inserted into the container 13 of the film forming device 100 and was held on a copper block 16 including the electric heater 14. Next, the aqueous solution L was introduced to the container 13, and the aqueous solution L was brought into contact with the surface of the substrate 11. The aqueous solution L was produced by mixing NaF of 0.5 ppm and $NaSO_4$ of 20 ppm with water and blending the resultant with NaOH to have a pH of 5. The pH of the aqueous solution was measured under ordinary temperature.

Thermocouples 15 were embedded into the copper block 16, a temperature of the surface of the substrate 11 was calculated using a formula of Fourier from temperature grades of these thermocouples 15, and a voltage of the electric heater 14 was supplied such that the temperature of the surface of the substrate 11 became 150° C. Since the aqueous solution L was vaporized, the aqueous solution L was constantly supplied to the container 13 with a drop pump 17. At this time, it was confirmed that the aqueous solution L was stably boiled, this boiling was in a nucleate boiling region on a boiling curve, and dryout did not occur. The dryout refers to a point at which an applied heat amount becomes excessively large, and therefore a boiling surface is covered with vapor and not in contact with liquid, and thus the temperature of the boiling surface rapidly increases. This state was held for one hour, and the corrosion resistant film 12 was formed on the surface of the substrate 11. After the film formation, the substrate 11 coated with the corrosion resistant film 12 was extracted and cleaned with cleaning water, thus obtaining a specimen of a corrosion resistant member.

Example 2

Similarly to Example 1, a specimen of the corrosion resistant member was manufactured. A point different from Example 1 is that $NaSO_4$ added to the aqueous solution was designed to have a concentration of 0.18 ppm.

Comparative Example 1

The substrate described in Example 1 was dipped for two hours in high-temperature water at 95° C. to manufacture a specimen of a corrosion resistant member on which boehmite treatment was performed.
(Film Thickness Measurement)

Figure 8A:
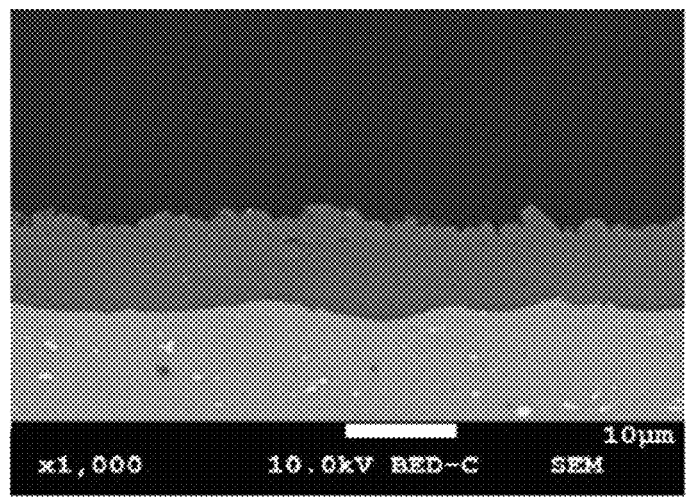
FIG. 8A is a cross-sectional photograph of a corrosion resistant member according to Example 1.
Figure 8B:
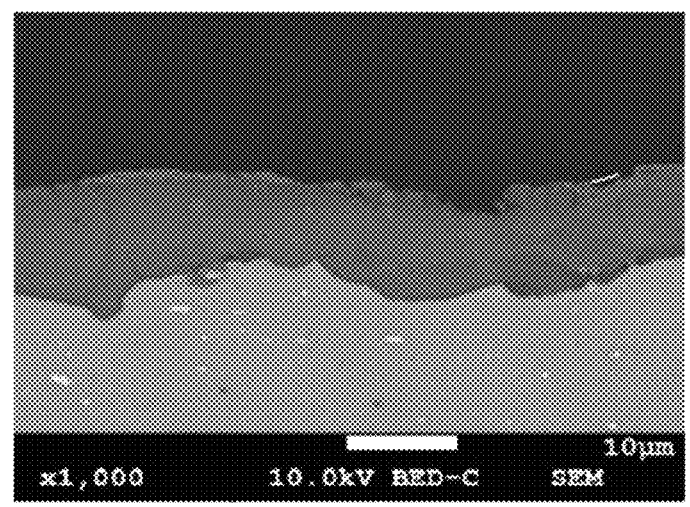
FIG. 8B is a cross-sectional photograph of a corrosion resistant member according to Example 2.

The corrosion resistant members (specimens) according to Examples 1 and 2 were cut in the thickness direction, and their cross-sectional surfaces were observed with SEM. FIG. 8A and FIG. 8B illustrate the results. As shown in FIG. 8A and FIG. 8B, the thicknesses of the corrosion resistant films of the specimens of Examples 1 and 2 were around 10 μm.

(Elementary Analysis)

Elementary analysis of the corrosion resistant films of the specimens according to Examples 1 and 2 was performed by energy dispersive X-ray spectroscopy (EDX). The following Table 1 shows the results. F/Al and S/Al of the corrosion resistant film when a content of aluminum by at % was defined as Al, a content of fluorine by at % was defined as F, and a content of sulfur by at % was defined as S were calculated.

TABLE 1

| Element | Example 1 | Example 2 |
|---|---|---|
| Oxygen | 38.56 at % | 38.08 at % |
| Fluorine | 2.09 at % | 1.68 at % |
| Sulfur | 0.56 at % | 0.32 at % |
| Aluminum | 58.80 at % | 59.92 at % |
| F/Al | 0.036 | 0.028 |
| S/Al | 0.010 | 0.005 |

It has been found from the results of Table 1 that the corrosion resistant films described in Examples 1 and 2 are films containing oxygen, fluorine, and sulfur in the aluminum. It has been found that F/Al of these corrosion resistant films is in the range of from 0.028 to 0.036 and S/Al is in the range of from 0.005 to 0.010. Although the contents of the oxygen in the corrosion resistant films of Examples 1 and 2 were similar extent, the content of the sulfur in the corrosion resistant film of Example 1 was twice the content of the sulfur of Example 2.

(Anti-Corrosion Test)

The anti-corrosion test was conducted on the specimens of Examples 1 and 2 and Comparative Example 1. Specifically, aqueous solutions containing nitric acid of pH3 were heated to 100° C., these specimens were dipped in the aqueous solutions for 24 hours, and a gravity change was measured. Table 2 shows the results. Table 2 shows assuming that a weight of the specimen before the testing is 100%.

TABLE 2

| | Example 1 | Example 2 | Comparative Example 1 |
|---|---|---|---|
| Before testing | 100% | 100% | 100% |
| After testing | 100% | 99.87% | 70.51% |
| Weight difference | 0.00% | 0.13% | 29.49% |

From Table 2, while Example 1 and Example 2 hardly corroded by the anti-corrosion test, the specimen of Comparative Example 1 corroded and reduced its weight by about 30%. Note that a corrosion speed in Example 2 is equivalent to 0.11 mm/year under general corrosion environment, which is a result generally known as not being corroded.

While the one embodiment of the present disclosure has been described in detail above, the present disclosure is not limited thereto, and can be subjected to various kinds of changes in design without departing from the spirit and scope of the present disclosure described in the claims.

While the intercooler is exemplified as an example of the heat exchanger in the second embodiment, for example, the corrosion resistant film may be applied to a water cooling condenser, a water cooling radiator, or the like, in addition to the intercooler.

DESCRIPTION OF SYMBOLS

1 Fuel cell system
3 Fuel cell stack
10 Corrosion resistant member
11 Substrate
12 Corrosion resistant film
34 Air compressor
35 Intercooler (heat exchanger)
35B Storage portion
35a Wall portion
37A, 37B Mist separator (produced water supply portion)
L Aqueous solution

What is claimed is:

1. A film forming method of a corrosion resistant film, comprising:

bringing a substrate made of aluminum into contact with an aqueous solution containing sulfate ions and fluoride ions; and heating the substrate to boil the aqueous solution on a surface of the substrate to form a corrosion resistant film on the surface of the substrate, the corrosion resistant film containing oxygen, fluorine, and sulfur derived from the aqueous solution and aluminum derived from the substrate, wherein during the heating, air bubbles are repeatedly generated in the aqueous solution on the surface of the substrate and desorbed from the surface of the substrate, resulting in repeated dissolution of an oxide film on the surface of the substrate and repeated taking of the sulfate ions and the fluoride ions into the surface of the substrate to form the corrosion resistant film.

2. The film forming method of the corrosion resistant film according to claim 1, wherein the substrate forms a wall portion of a storage portion that stores the aqueous solution as a part of a heat exchanger, wherein in the bringing, the storage portion is caused to store the aqueous solution, and wherein in the heating, a heat of a thermal fluid introduced to the heat exchanger and having a temperature higher than a boiling point of the aqueous solution is transmitted to the aqueous solution via the wall portion to boil the aqueous solution.

3. The film forming method of the corrosion resistant film according to claim 2, wherein the heat exchanger is disposed in a fuel cell system including a fuel cell stack that performs electric generation with a air and a hydrogen gas, wherein the aqueous solution is produced water produced during the electric generation by the fuel cell stack, wherein the thermal fluid is an air discharged from an air compressor, wherein in the bringing, the produced water produced in the fuel cell stack is supplied to the storage portion, and wherein in the heating, the air discharged from the air compressor is supplied to the heat exchanger.

4. The film forming method of the corrosion resistant film according to claim 1, wherein in the bringing, the sulfate ions have a concentration of 0.18 ppm or more, the fluoride ions have a concentration of 0.03 ppm or more in the aqueous solution, and pH of the aqueous solution at a temperature of 20° C. is from 3 to 6.

5. The film forming method of the corrosion resistant film according to claim 1, wherein in the heating, the aqueous solution is boiled in a nucleate boiling region.

6. A film forming method of a corrosion resistant film, comprising:

storing an aqueous solution containing sulfate ions and fluoride ions in a storage portion, the storage portion being part of a heat exchanger with a wall portion of the storage portion formed of a substrate made of aluminum, the substrate being in contact with the aqueous solution during the storing; and heating the substrate by a heat of a thermal fluid that is introduced to the heat exchanger, the thermal fluid having a temperature higher than a boiling point of the aqueous solution so that heat is transmitted to the aqueous solution via the wall portion to boil the aqueous solution on a surface of the substrate to form a corrosion resistant film on the surface of the substrate, the corrosion resistant film containing oxygen, fluorine, and sulfur derived from the aqueous solution and aluminum derived from the substrate.

7. The film forming method of the corrosion resistant film according to claim 6, wherein the heat exchanger is disposed in a fuel cell system including a fuel cell stack that performs electric generation with an air and a hydrogen gas, wherein the aqueous solution is produced water produced during the electric generation by the fuel cell stack, wherein the thermal fluid is an air discharged from an air compressor, wherein in the storing, the produced water produced in the fuel cell stack is supplied to the storage portion, and wherein in the heating, the air discharged from the air compressor is supplied to the heat exchanger.

* * * * *